United States Patent
Peirce et al.

(10) Patent No.: US 8,788,731 B2
(45) Date of Patent: Jul. 22, 2014

(54) VEHICLE MESSAGE FILTER

(75) Inventors: Kenneth L. Peirce, Grosse Pointe Farms, MI (US); Thomas M. Forest, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 46 days.

(21) Appl. No.: 13/561,515

(22) Filed: Jul. 30, 2012

(65) Prior Publication Data
US 2014/0032800 A1  Jan. 30, 2014

(51) Int. Cl.
*G06F 13/42* (2006.01)
*G06F 15/16* (2006.01)
*H04M 1/725* (2006.01)

(52) U.S. Cl.
USPC .................. 710/105; 455/412.2; 709/206

(58) Field of Classification Search
USPC .................. 710/105; 455/412.2; 709/206
See application file for complete search history.

(56) References Cited

U.S. PATENT DOCUMENTS

| | | | | |
|---|---|---|---|---|
| 7,149,206 B2 * | 12/2006 | Pruzan et al. | ................ | 370/349 |
| 8,126,435 B2 * | 2/2012 | George | ................ | 455/412.2 |
| 2006/0068700 A1 * | 3/2006 | Habaguchi et al. | ............... | 455/7 |
| 2008/0039998 A1 * | 2/2008 | Fein et al. | ....................... | 701/36 |
| 2008/0064324 A1 * | 3/2008 | Nix | .............................. | 455/3.02 |
| 2009/0298474 A1 * | 12/2009 | George | ..................... | 455/412.2 |
| 2010/0240307 A1 * | 9/2010 | Sims et al. | ................... | 455/41.3 |
| 2013/0117021 A1 * | 5/2013 | James | .......................... | 704/235 |

* cited by examiner

*Primary Examiner* — Paul R Myers
*Assistant Examiner* — Christopher a Daley
(74) *Attorney, Agent, or Firm* — Anthony Luke Simon; Reising Ethington P.C.

(57) ABSTRACT

A message filtering system for a communications system in a vehicle enabling communication between various systems and subsystems via a vehicle bus. Electronic devices may be coupled to the bus. Electronic control units (ECUs) may be located therebetween. The ECU may regulate or control the flow of messages between the bus and the electronic devices. Message filters may apply a filter policy to incoming and outgoing messages. In addition, the message filtering system may have an alert policy for violations of the filter policy. In one embodiment, the source identity of outgoing messages may be overwritten by a message filter dedicated to outgoing messages; this message filter may be an application specific integrated circuit.

20 Claims, 7 Drawing Sheets

VEHICLE MESSAGE FILTER

TECHNICAL FIELD

The present invention relates generally to a communication system within a vehicle and more specifically to filtering messages over a vehicle network within the vehicle.

BACKGROUND OF THE INVENTION

Automobiles today typically include a plurality of electronic control units or ECUs that perform various functions. The ECUs may be connected together via a vehicle local area network which can be implemented using a serial bus using one or more network topologies and protocols known to those skilled in the art. In part, the ECUs may control or regulate data sent and received over the bus between various subsystems (e.g., an engine controller, a navigation subsystem, diagnostic subsystem, and the like).

SUMMARY OF THE INVENTION

According to an aspect of the invention, there is provided a message filtering system for a vehicle network, comprising: a bus having two or more nodes, wherein the bus is a conduit for the transmission of messages; one or more electronic control units (ECUs) having a protocol controller therein, wherein at least one ECU is coupled to the bus at one of the nodes; and a transmit filter located between the protocol controller and the bus, wherein the transmit filter complies with a filter policy which is used to determine whether outgoing messages from the ECU should be sent onto the bus, wherein the transmit filter terminates the transmission of the message if the message violates the filter policy.

In accordance with another aspect of the invention, there is provided a method of filtering messages from an electronic control unit (ECU) in a vehicle network, comprising the steps of: receiving an outgoing message from a vehicle system module (VSM) via an ECU at a transmit filter, wherein the outgoing message is to be sent over a bus in a vehicle network, wherein the transmit filter has a filter policy; determining whether the outgoing message violates the filter policy; and then either: terminating the outgoing message based upon a violation of the filter policy, or sending the outgoing message onto the bus, to be delivered to its destination.

In accordance with another aspect of the invention, there is provided an electronic control unit (ECU) in a controller area network (CAN), comprising: a receive filter for filtering incoming messages, coupled to a CAN bus; a protocol controller, coupled to the receive filter; one or more registers, coupled to the receive filter and the protocol controller, wherein the registers may include status registers, transmit registers, and receive registers; and a transmit filter for filtering outgoing messages, wherein the transmit filter is coupled to the protocol controller and the CAN bus.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The apparatus and method described below pertains to a communications system within a vehicle enabling communication between various systems and subsystems via a vehicle bus. The bus may have one or more nodes connected thereto. The nodes may couple a vehicle system module (VSM) or other electronic device to the bus. Electronic control units (ECUs) may be between the nodes and the respective electronic device coupled thereto. The ECU may regulate or control the flow of messages between the bus and the electronic device; in some cases, the message(s) may be terminated at the ECU—typically by filter circuitry.

Communications System

Figure 1:
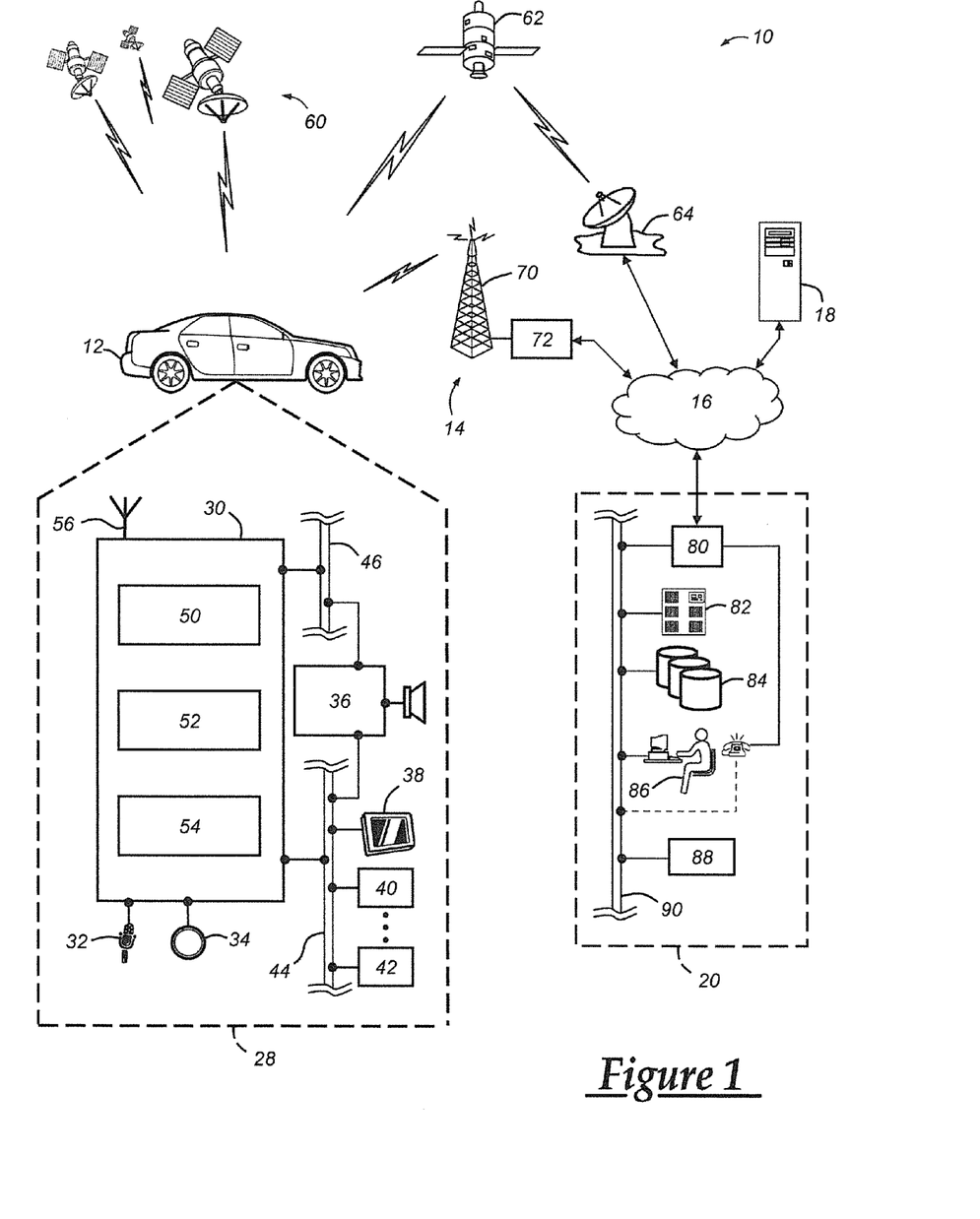
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the apparatus and method disclosed herein. Communications system 10 generally includes a vehicle 12, one or more wireless carrier systems 14, a land communications network 16, a computer 18, and a call center 20. It should be understood that the disclosed apparatus and method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed apparatus and method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the apparatus and method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
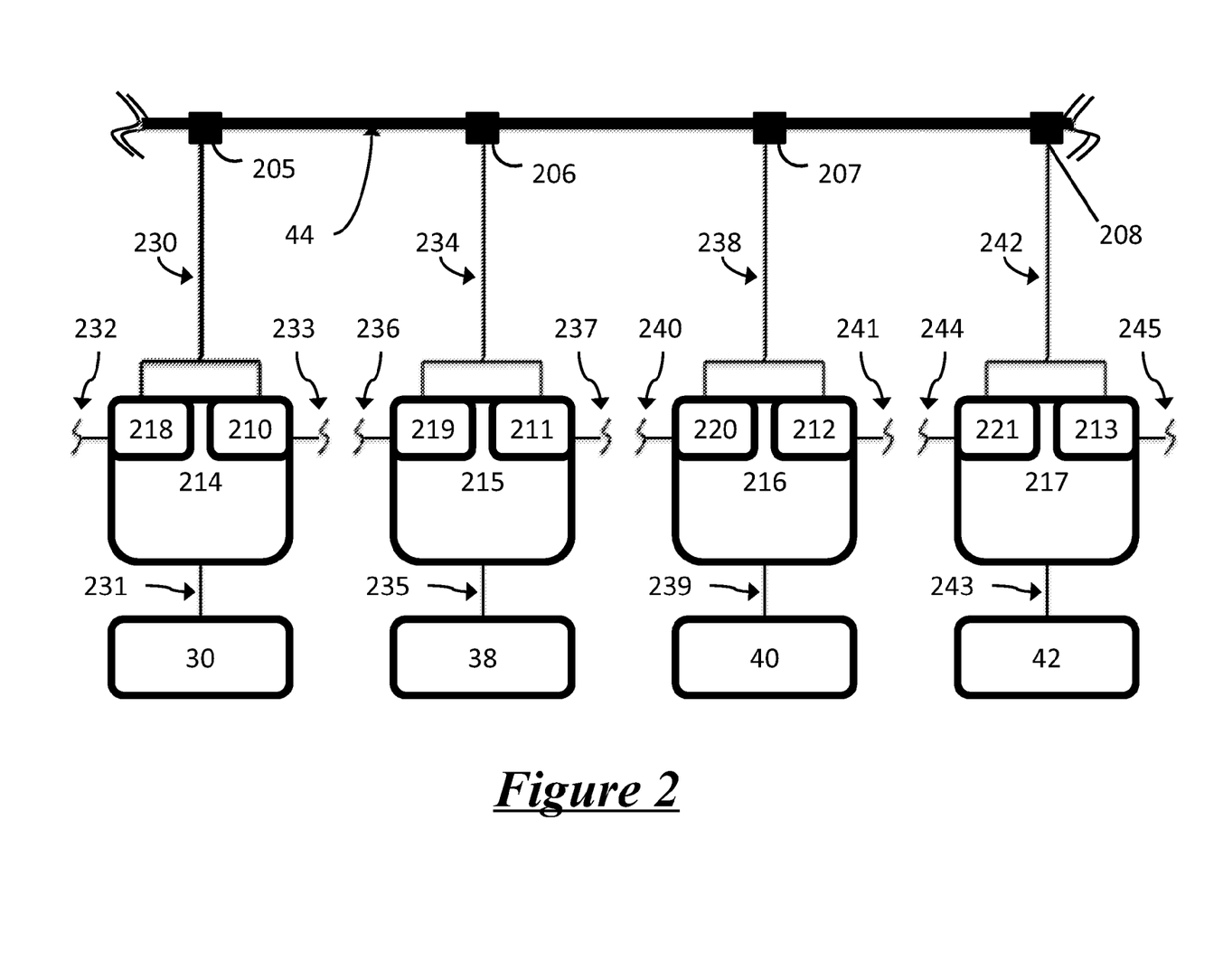
FIG. 2 is a block diagram of a vehicle network including a bus, a plurality of ECUs, a telematics unit, and a plurality of vehicle system modules.

Turning to FIG. 2, there is shown an exemplary vehicle network. The vehicle network may be CAN, MOST, LIN, LAN or other suitable protocol, standard, etc. The illustrated vehicle network includes a plurality of electronic control units (ECUs) 214, 215, 216, 217, a plurality of transmit filters 210, 211, 212, 213, a plurality of receive filters 218, 219, 220, 221, the telematics unit 30, and a plurality of VSMs 38, 40, 42. FIG. 2 illustrates that the transmit filters 210, 211, 212, 213 and the receive filters 218, 219, 220, 221 are coupled to each of the ECUs 214, 215, 216, 217, respectively. The ECUs 214, 215, 216, 217 are coupled via VSM interfaces 231, 235, 239, 243 to the telematics unit 30 and each of the VSMs 38, 40, 42, respectively. Each of the ECUs 214, 215, 216, 217 (e.g., via the transmit filters and receive filters) may be coupled to an exemplary bus (e.g., bus 44) via primary interfaces 230, 234, 238, and 242 at nodes 205, 206, 207, 208. Thus, the bus 44 may indirectly connect the telematics unit 30 and VSMs 38, 40, 42 to one another. FIG. 2 further illustrates that the transmit filters 210, 211, 212, 213 may have secondary interfaces 233, 237, 241, 245, respectively. And FIG. 2 illustrates that the receive filters 218, 219, 220, 221 may also have secondary interfaces 232, 236, 240, 244, respectively. These secondary interfaces are an optional means of connecting to the transmit and receive filters and some filters may have the secondary interfaces while others do not. Also, it should be appreciated that the VSMs shown and the telematics unit are merely exemplary; other peripheral devices, subsystems, or VSMs may be used as well.

The vehicle network may facilitate the transmission of and receipt of messages or information to other VSMs in the vehicle 12. Where, for example, the vehicle network is CAN, a general message format may include a sync, a header, a data field, error detection, and an end. The sync may be a single dominant bit (e.g., start of frame or SOF). The header may be an 11-bit or 29-bits and may include priority information (e.g., which message travels on the bus first). It may further contain a source identifier (or source ID), a destination identifier (or destination ID), and a message identifier (or message ID). The data field may contain the message or information sent/received. The error detection may be used to detect corrupted data. And the end may indicate the conclusion of the message.

The transmit filters 210, 211, 212, 213 and/or the receive filters 218, 219, 220, 221 may be subject to a filter policy (e.g., one or more rules). The filter policy may include executable instructions for implementing logical functions which may include validating or verifying the authenticity of the message contents. Executable instructions of the policy include software or firmware and is not limited to routines, modules, objects, components, data structures, and/or the like, for performing particular tasks and/or implementing particular abstract data types. The message contents include any part or portion of the message. Thus, the message contents may include the message identity. In CAN networks for example, the message identity may include the source ID, the destination ID, the message ID, or any combination thereof. In TCP/IP networks, the message identity may include the source IP address, the destination IP address, the source port, the destination port, or any combination thereof. The message contents may also include the message information contained within the message—i.e., the actual message or information being conveyed (e.g., in CAN networks, the data field). And the message contents may include other message characteristics as well (e.g., the priority or the length of the message).

The filter policy may minimize or eliminate the transmission of corrupt messages over the bus 44. Corrupt messages include any undesirable or invalid or improper message. They may be generated by a malicious third party (e.g., a hacker) or simply by a corrupted or damaged bus, ECU, VSM, or other subsystem. When the corrupted message is sent over the bus (e.g., 44), other subsystems (including VSMs) may reply and/or take action resulting in an inaccurate, improper, and even harmful effect on the vehicle and its occupants. For example, a hacked or damaged infotainment system may send a corrupt message onto the bus 44 which it might not normally send—for instance a corrupt message regarding the vehicle's wheel speed. This corrupt message may then be received by a traction control system within the vehicle resulting in below-normal traction-control performance.

Figure 3:
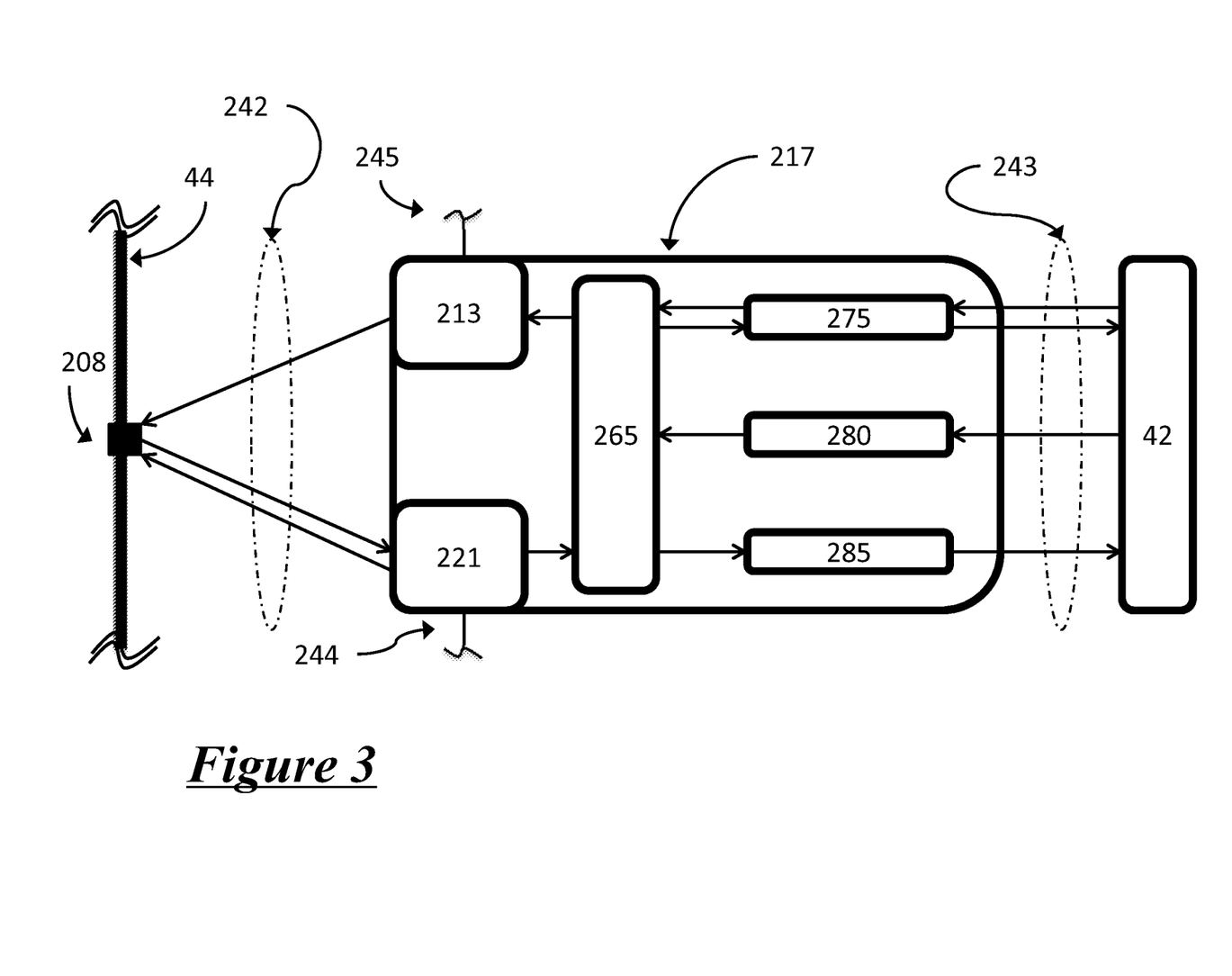
FIG. 3 is a block diagram of a first embodiment of an ECU.

When implementation of the vehicle network in FIG. 2 is CAN, CAN may utilize one or more ECUs to deliver messages. The structure, interaction, and performance of the bus 44, the ECU 217, and the VSM 42 in FIG. 3 are exemplary of other ECUs and VSMs. In FIG. 3, the ECU 217 may regulate or control the flow of messages between the bus 44 and VSM 42. The ECU 217 may include a protocol controller 265, the transmit filter 213, the receive filter 221, one or more status registers 275, a transmit register (or buffer) 280, and a receive register (or buffer) 285. FIG. 3 illustrates the primary interface 242 between the ECU 217 and the bus 44. Also shown is the VSM interface 243 between the ECU 217 and the VSM 42. The secondary interfaces 244, 245 are also illustrated coupled to the receive filter 221 and transmit filter 213, respectively. The protocol controller 265 may include a CAN processor and may control data between it and the registers 275, 280, 285, the transmit filter 213, and the receive filter 221.

An incoming message may be received from the bus 44 via the primary interface 242, pass through the receive filter 221, be received by the protocol controller 265, be received by the receive register 285, and finally then be sent to the VSM 42 via the VSM interface 243. An outgoing message may be sent by the VSM 42, be received by the transmit register 280 via the VSM interface 243, be received by the protocol controller 265, pass through the transmit filter 213, and then finally be sent to the bus 44 via primary interface 242. The status register 275 may be used as a read/write memory (e.g., by controller 265). The transmit register 280 may store (e.g., temporarily) the outgoing message (e.g., in a queue). And the receive register 285 may store (e.g., temporarily) the incoming message (e.g., in a queue).

As previously discussed, the filter policy may pertain to validating or verifying the authenticity of the message contents. The receive filter 221 may validate the message contents of incoming messages (i.e., those received from the bus 44). For example, in CAN systems, the receive filter 221 may store known message IDs in accordance with the filter policy. The receive filter 221 may then compare the message ID of an incoming message with the known message IDs in its storage to validate whether the incoming message should be accepted or not by the VSM 42. Where the incoming message ID matches one of the known message IDs, then the incoming message may be validated and may be sent to the VSM 42. Where it does not match, the message may be corrupt and the transmission of the incoming message may be terminated never reaching the VSM 42.

The transmit filter 213 may validate or verify the message contents of outgoing messages (i.e., those being sent to the bus 44). For example, in CAN systems, the transmit filter 231 may store the source ID of the VSM 42 (and/or the ECU 217) in accordance with the filter policy. It may further ensure that outgoing messages contain the source ID of the VSM 42. For example, the transmit filter 213 may compare the source ID of an outgoing message with the source ID of the VSM 42 to validate whether the outgoing message should be sent or not. Where the source ID of the outgoing message matches the source ID of the VSM 42, then the outgoing message may be validated and may be sent to the bus 44. Where it does not match, the message may be corrupt and the transmission of the outgoing message may be terminated never reaching the bus 44.

In one embodiment, the transmit filter 213 may overwrite the source ID previously contained within the outgoing message—regardless of whether it was accurate. The filter policy of the transmit filter 213 may include instructions to overwrite based on predefined criteria or circumstances. In one embodiment, the transmit filter 213 may be an application specific integrated circuit (ASIC) which may overwrite the source ID of any outgoing message; furthermore, this may be its only function.

Figure 4:
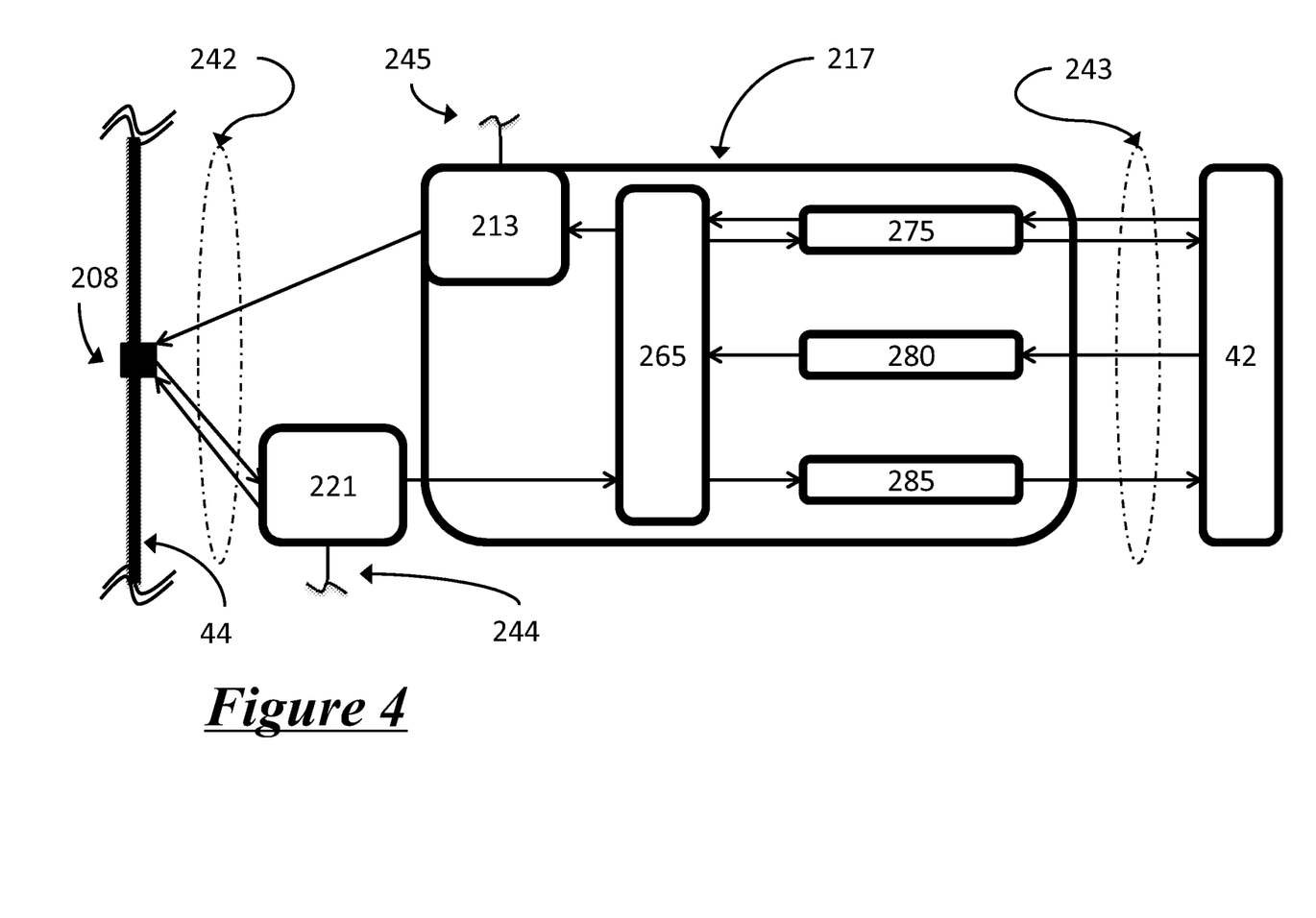
FIG. 4 is a block diagram of a second embodiment of an ECU.

Turning to FIG. 4, there is shown an embodiment of the bus 44, the ECU 217, and the VSM 42 that is generally similar to that of FIG. 3; however, the transmit filter 213 is shown physically and/or logically isolated from the ECU 217 and/or the protocol controller 265. Physical isolation may include hardware separation (e.g., being on different circuit boards or in different housings). Logical isolation may include separation or segregation from the control (or control logic) of the protocol controller 265. It may also include separation using one or more logic gates (e.g., a physical device implementing a Boolean functions including AND, OR, NOT, NAND, NOR, XOR, XNOR, etc.). The physical and/or logical isolation may mitigate the possibility of corruption of the transmit filter 213 in the event that the ECU 217 and/or the protocol controller 265 becomes corrupted.

Figure 5:
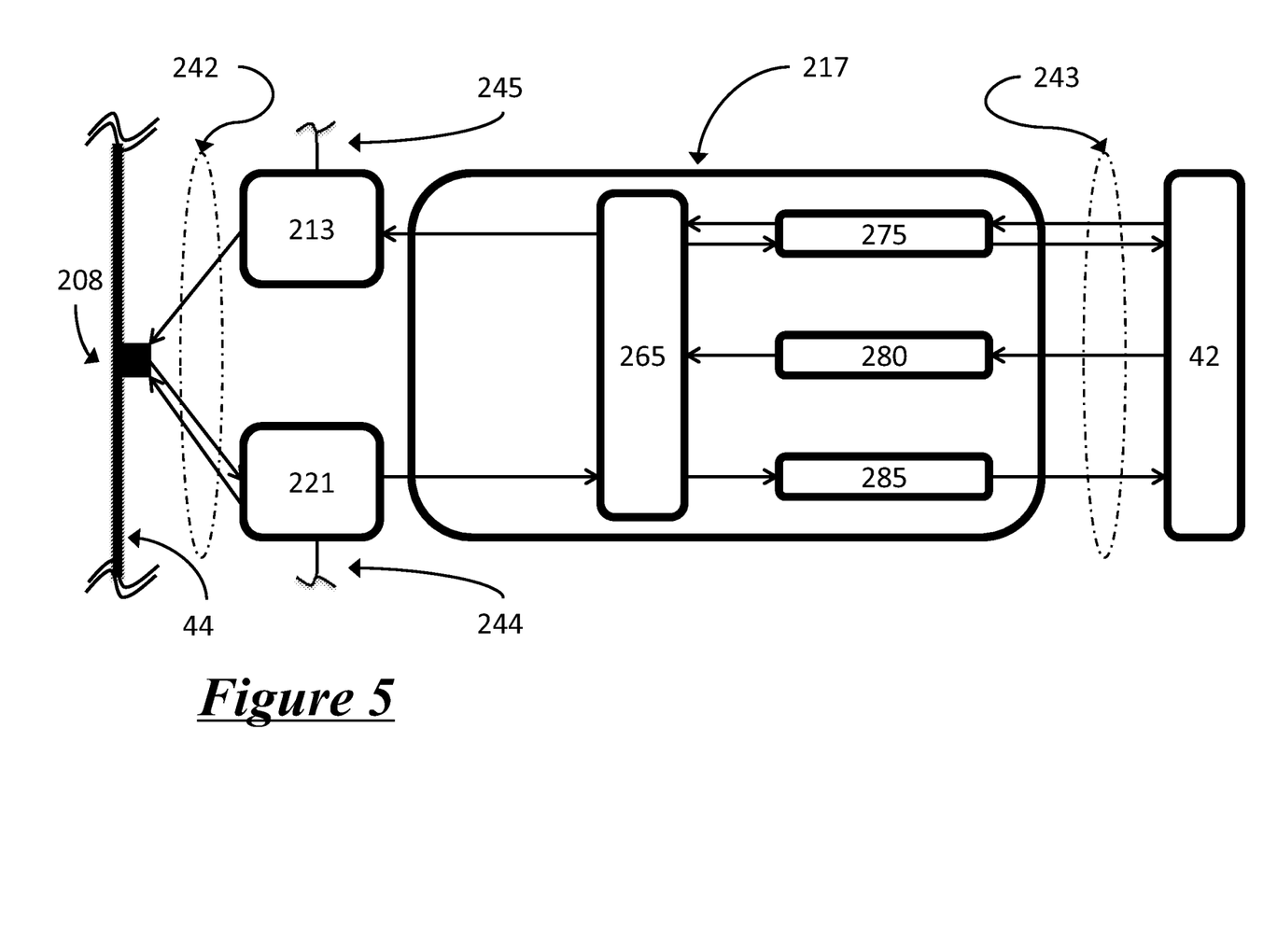
FIG. 5 is a block diagram of a third embodiment of an ECU.

Turning to FIG. 5, there is shown another embodiment of the bus 44, the ECU 217, and the VSM 42 that is generally similar to that of FIG. 4; however, in FIG. 5, both the transmit filter 213 and the receive filter 221 are shown physically and/or logically isolated from the ECU 217 and/or the protocol controller 265—thus, mitigating the possibility of corruption of both.

The filter policy may be altered or updated. An authorized third party may alter, change, program, reprogram, update, or modify a filter policy of one or more of the transmit and/or receive filters (210, 211, 212, 213, 218, 219, 220, 221). The third party may include a human or computer; in one example, it may be facilitated by the vehicle manufacturer. In one embodiment, when a update to the filter policy is attempted, the transmit and/or receive filter may seek to validate or verify the source & integrity of the update. This validation/verification may be accomplished using a digital cryptographic signature, and may include the use of one or more mathematical formulas or schemes. The transmit and/or receive filter 213, 221 may also have a key which must be paired or matched or otherwise compared or combined with the signature in order to validate its authenticity. Mathematical formulas and schemes and other encryption techniques are known to those skilled in the art. Where the signature is not recognized, the attempt to update the filter policy may fail, and the transmit or receive filter may continue to utilize its current policy.

Updates to the filter policy may be received by the transmit or receive filters via the bus 44 and the primary interface 242 or via the secondary interfaces 244, 245. The security of these updates may be enhanced when the transmit and/or receive filters 213, 221 are isolated from the ECU 217 (e.g., in FIGS. 4 and 5). The security may be enhanced, because the isolation may mitigate or eliminate an attempt by the controller 265 to overwrite or apply an out-of-date filter policy to the transmit and/or receive filters 213, 221. Examples of when the controller 265 may attempt to apply such out-of-date policies include instances where the controller 265 has malfunctioned, has been damaged, or has been the subject of a malicious attack. Security may further be enhanced when the update occurs over the secondary interfaces 244, 245; i.e., isolated from the bus 44.

The transmit and/or receive filters 213, 221 also may be subject to an alert policy (e.g., one or more rules). The alert policy may include executable instructions for implementing logical functions which may include detecting suspicious network activity and generating alerts. Like the filter policy, the alert policy may be altered or updated by an authorized third party and also may require a digital cryptographic signature. And also similarly, security may be enhanced when the transmit and/or receive filters 213, 221 are isolated and/or the secondary interfaces 244, 245 are used during updates.

Suspicious network activity may arise in multiple ways. One example of suspicious activity includes instances where the transmit and/or receive filter 213, 221 terminated the transmission of an incoming or outgoing message due to a violation of the filter policy. Another example includes a failed update to the filter policy or the alert policy due to an unrecognized digital cryptographic signature. When suspicious network activity is detected, an alert may be generated. The alert may trigger or include a diagnostic trouble code or DTC.

When the transmit or receive filter 213, 221 generates an alert, a message may be sent from the filter to the bus 44 or via the secondary interface (e.g., 244, 245). Where the secondary interface 244, 245 is used, it may be a discrete signal (or connection) or may be a dedicated bus. Thus, the alert may be directly or indirectly sent to other VSMs or subsystems (e.g., to a diagnostics device or other suitable device which may further manage the alert). The alert may contain information or data regarding the nature of the alert (e.g., whether the alert is a failed attempt to alter the filter or alert policy or whether the alert is the detection of a corrupt message sent over the bus 44 or whether the alert is the detection of an attempt to send a corrupt message).

Method

Figure 6:
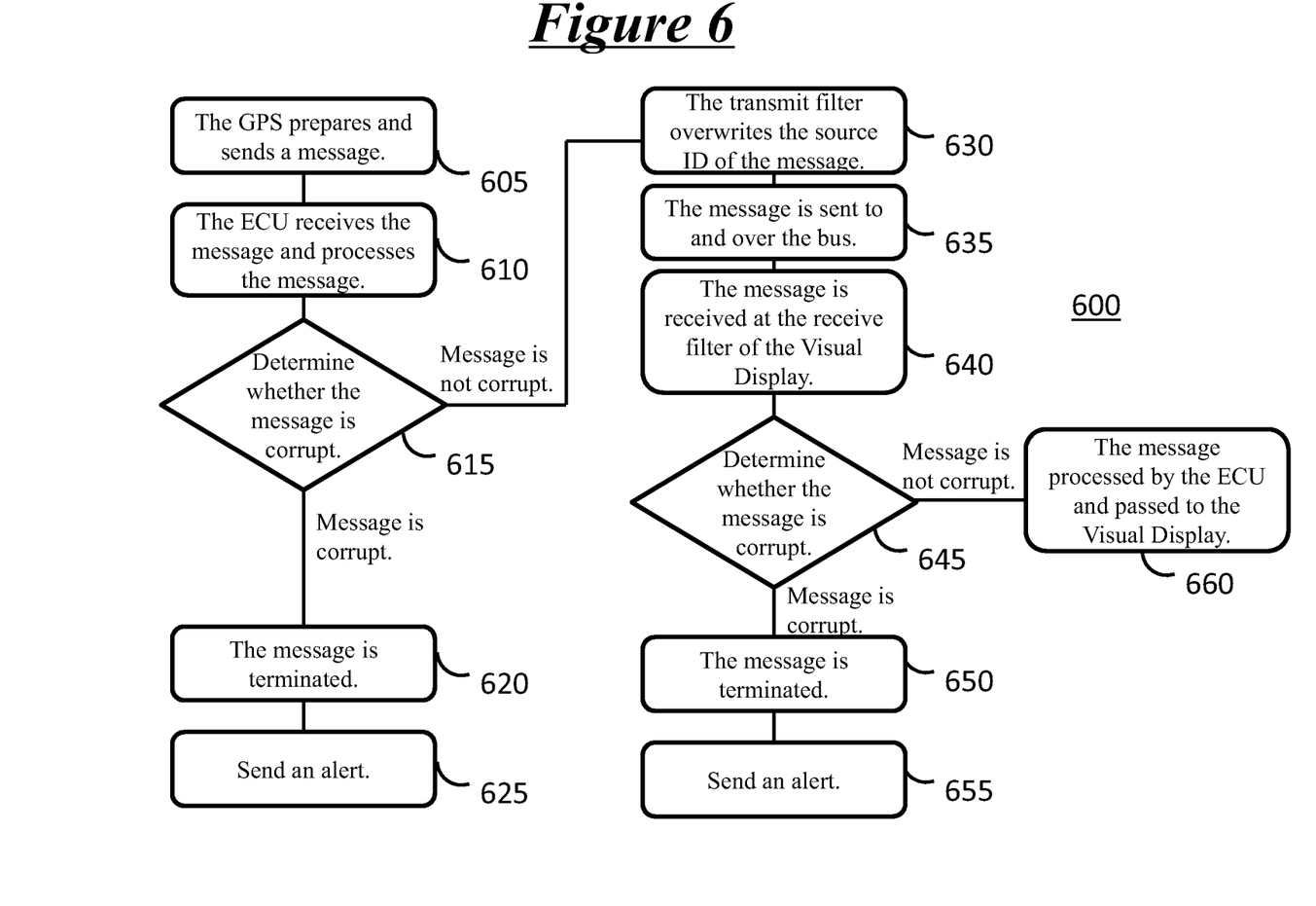
FIG. 6 is a flowchart illustrating a method of message filtering.

Turning now to FIG. 6, there is shown one exemplary method 600 of sending a message from VSM 42 over the communications bus 44 to the visual display 38 (see also FIGS. 2, 5). In step 605, the GPS 40 prepares and sends the message (e.g., traffic and weather information). In an exemplary vehicle network such as CAN, the message may include both a source ID and destination ID before it leaves the VSM 42. In step 610, the ECU (e.g., 217) may receive the message via VSM interface 243 at the transmit register 280 and process the message using the controller 265. In step 615, the transmit filter 213 may apply the current filter policy and determine whether the message is corrupt. If the message is corrupt, the transmit filter may terminate the transmission (step 620) and send an alert via secondary interface 245 (step 625). If the message is not corrupt, the transmit filter 213 (at step 630) may overwrite the source ID with the source ID of the VSM 42. This ensures that if the message was corrupted by the ECU 217 but not detected by the filter policy of the transmit filter 213, its source ID is accurate before transmission over the bus 44. This enhances security, because the filter policy of other receive filters in other ECUs may include a rule to reject a message based upon its source ID. At step 635, the message may be received onto the bus 44 via the primary interface 242. The message may be received by the receive filter 219 at the primary interface 234 (step 640). At step 645, the receive filter 219 may apply its filter policy and determine whether to permit the message to pass. This filter policy may include a rule that messages from VSM 42 are permissible (e.g., and may be validated using the message's source ID). It may also include a rule that only allows messages having a correct destination ID to pass through (e.g., the destination ID of the visual display 38). If the message is corrupt, the receive filter 219 may terminate the transmission (step 650) and send an alert via secondary interface 236 (step 655). If the message is not corrupt (and if it contains the correct destination ID), the receive filter 219 (at step 660) may allow the message to pass to the ECU 215 where it may be received by the controller and receive register therein and then passed to the visual display 38 via the VSM interface 235.

Figure 7:
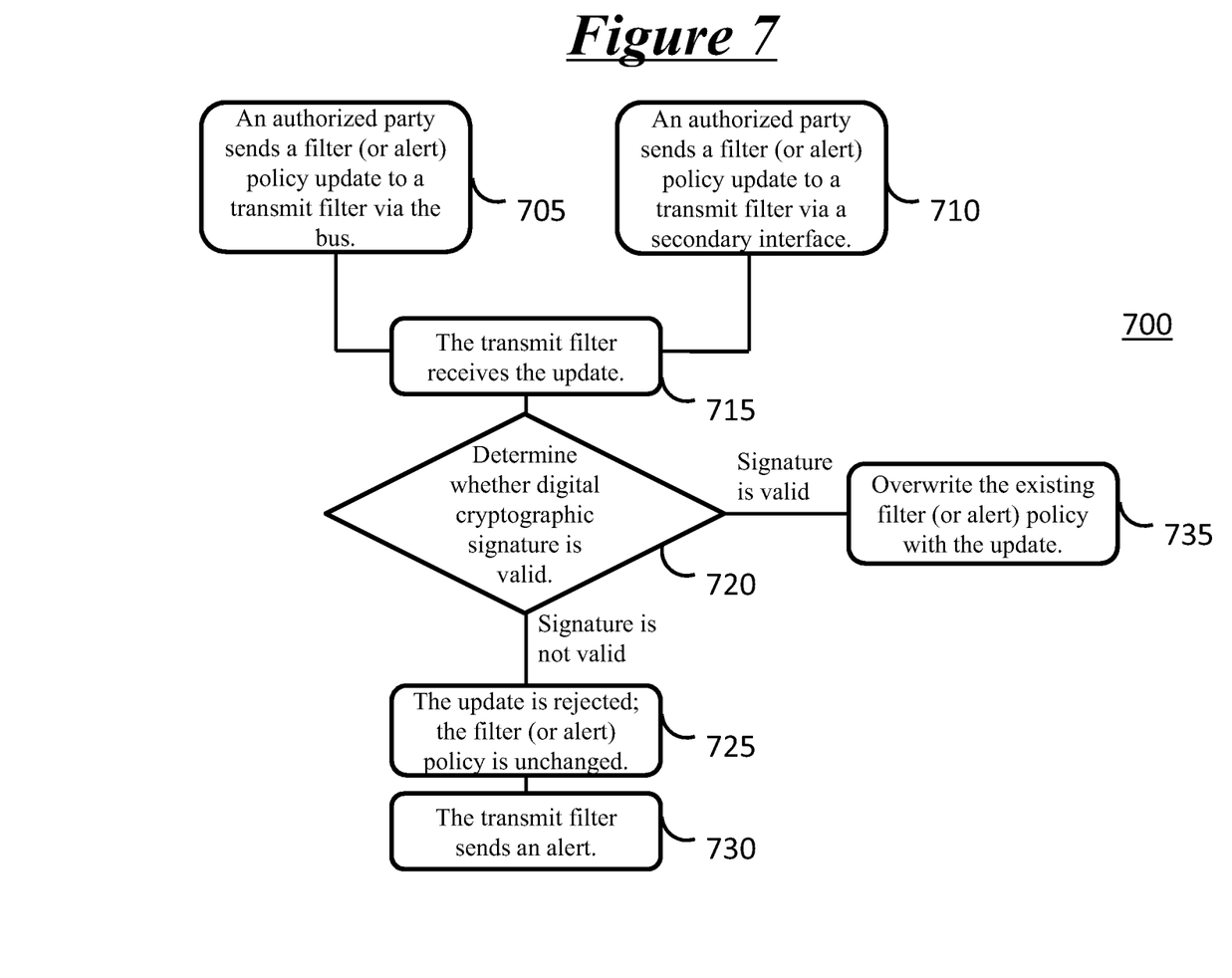
FIG. 7 is a flowchart illustrating a method of updating the policy of a message filter.

Turning now to FIG. 7, there is shown one exemplary method 700 of altering a filter or alert policy of a transmit or receive filter. In steps 705 and 710, an authorized third party may send an update to transmit filter 213 (FIGS. 2, 5) having a digital cryptographic signature. In step 705, the update is sent via the bus 44. In step 710, the update is sent as a discrete signal via secondary interface 245. Transmit filter 213 is exemplary and this method could be applied to any receive or transmit filter. At step 715, the transmit filter 213 receives the update. At step 720, the transmit filter 213 determines whether the signature is valid. If the signature is not valid, the transmit filter 213 rejects the filter policy update (step 725) and sends an alert via the bus 44 and/or the interface 245 (step 730). If the signature is valid, the transmit filter 213 accepts the filter policy update and permits its policy to be overwritten or otherwise altered (step 735).

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A message filtering system for a vehicle network, comprising:
   a vehicle bus having a plurality of nodes for the transmission and reception of messages to and from the bus;
   a plurality of electronic control unit (ECUs), each of the plurality of ECU being coupled to one of the nodes and each being associated with a different network device on the bus, wherein each of the plurality of ECU has a controller and a transmit filter of the plurality of ECU that is located between the controller and its respective node, wherein the transmit filter is configured with a filter policy that terminates the transmission of an outgoing message from the respective ECU prior to the message reaching the vehicle bus when if the message violates the filter policy.

2. The message filtering system as defined in claim 1, wherein the network devices include: a telematics unit and one or more vehicle system modules (VSMs).

3. The message filtering system as defined in claim 1, wherein the transmit filter is an application specific integrated circuit (ASIC).

4. The message filtering system as defined in claim 3, wherein the ASIC is configured to overwrite a source identifier within the outgoing message.

5. The message filtering system as defined in claim 1, wherein at least one of the transmit filters is physically isolated from its respective ECU.

6. The message filtering system as defined in claim 1, wherein at least one of the transmit filters is logically isolated from its respective ECU.

7. The message filtering system as defined in claim 1, further comprising a receive filter located between the controller and the respective node, wherein the receive filter complies with the filter policy which is used to determine whether an incoming message from the bus should be provided to the respective ECU, wherein the receive filter terminates the transmission of the message if the message violates the filter policy.

8. The message filtering system as defined in claim 7, wherein at least one of the receive filters is physically and logically isolated from its respective ECU.

9. The message filtering system as defined in claim 1, wherein the bus and plurality of ECUs comprise a local area network in the vehicle.

10. The message filtering system as defined in claim 1, wherein the transmit filter is configured with an alert policy that generates an alert for a vehicle diagnostics system when a violation of the filter policy occurs.

11. The message filtering system as defined in claim 10, wherein the configurations of the filter policy and the alert policy are updateable, wherein policy updates include a valid digital encryption signature.

12. The message filtering system as defined in claim 11, wherein the filter policy and the alert policy are configured to provide an alert when a policy update is presented with an invalid digital encryption signature.

13. A method of filtering messages in a vehicle network, comprising the steps of:
    providing a vehicle area network having a plurality of electronic control units (ECUs) each associated with a network device, the ECUs being interconnected via a bus, wherein at least two of the ECUs are associated with transmit filters having a filter policy and each being positioned between the bus and the respective ECU;
    receiving at a first transmit filter an outgoing message from one of the at least two ECUs;
    determining whether the outgoing message complies with the filter policy;
    based on the determination, either:
       terminating the outgoing message based upon a violation of the filter policy, or
       transmitting the outgoing message onto the bus; and
    when transmitted, receiving the outgoing message at the other of the at least two ECUs.

14. The method as defined in claim 13, wherein the first transmit filter is an application specific integrated circuit (ASIC).

15. The method as defined in claim 14, wherein outgoing message has a first source identifier (ID) and the transmitting step further comprises the first transmit filter overwriting the first source identifier with a second source identifier, wherein the second source identifier is associated with the respective ECU.

16. A method of filtering messages in a vehicle area network, comprising:
   providing a plurality of network device electronic control units (ECUs) coupled to a vehicle bus, wherein each of the plurality of network device ECUs has a transmit filter and is configured to apply a filter policy to outbound messages transmitted on the bus;
   receiving at a first transmit filter of one of the plurality of network device ECUs an outbound a message from a processor associated with the respective ECU;
   applying the filter policy to the outbound message; and
   transmitting the outbound message if the message passes the filter policy, else discarding the message if the message fails to pass the filter policy.

17. The method of claim 16, wherein each of the plurality of network device ECU has a receive filter that applies the filter policy to outbound messages transmitted over the vehicle bus when they are received at at least one of the respective ECUs.

18. The method of claim 17, wherein the transmit filters, the receive filters, or both are isolated from the respective ECUs.

19. The method of claim 16, further comprising reconfiguring the filter policy of the transmit filters, the receive filters, or both with an encrypted, new policy.

20. The method of claim 16, wherein applying the filter policy further comprises overwriting a first source identifier of the outbound message with a second source identifier.

* * * * *